United States Patent [19]
Aoki

[11] Patent Number: 5,712,839
[45] Date of Patent: Jan. 27, 1998

[54] LASER LIGHT POWER CONTROL SYSTEM HAVING REFLECTED LIGHT DETECTOR

[75] Inventor: Ikuo Aoki, Yokohama, Japan

[73] Assignee: Ricoh Company, Ltd., Tokyo, Japan

[21] Appl. No.: 588,143

[22] Filed: Jan. 18, 1996

[30] Foreign Application Priority Data

Jan. 19, 1995 [JP] Japan .................................. 7-024646

[51] Int. Cl.⁶ .................................. G11B 7/12; G11B 7/13
[52] U.S. Cl. .................................. 369/116; 369/58; 369/107; 369/59
[58] Field of Search .................................. 369/13, 116, 120, 369/121, 58, 59, 54, 107

[56] References Cited

U.S. PATENT DOCUMENTS

| | | | |
|---|---|---|---|
| 4,858,219 | 8/1989 | Yoshikawa | 369/116 |
| 5,005,164 | 4/1991 | Sakamoto et al. | 369/116 |
| 5,257,256 | 10/1993 | Terao et al. | 369/116 |
| 5,276,671 | 1/1994 | Minami et al. | 369/116 |
| 5,396,480 | 3/1995 | Morishita et al. | 369/116 |
| 5,479,392 | 12/1995 | Holtslag et al. | 369/116 |
| 5,561,642 | 10/1996 | Saito et al. | 369/116 |

FOREIGN PATENT DOCUMENTS 54-143109  11/1979  Japan .
57-60696   12/1982  Japan .

OTHER PUBLICATIONS

"CD-R and the compatibility with CD", Optical Memory Symposium 1994.

Primary Examiner—David C. Nelms
Assistant Examiner—Kim-Kwok Chu
Attorney, Agent, or Firm—Cooper & Dunham LLP

[57] ABSTRACT

A power control system controls power of light emitted from a light source to a recording medium. The light having a first power is used to erase previous information from the recording medium and the light having a second power is used to record information in the recording medium in a recording operation. The power control system includes a detecting unit for detecting reflected light from the recording medium when the light source emits the light having the first power to erase the information from the recording medium. The detecting unit outputs a reflection signal corresponding to the reflected light. The power control system further has a control unit for controlling the first power of the light emitted from the light source so that a level of the reflection signal output from the detecting means is controlled at a predetermined target level.

14 Claims, 11 Drawing Sheets

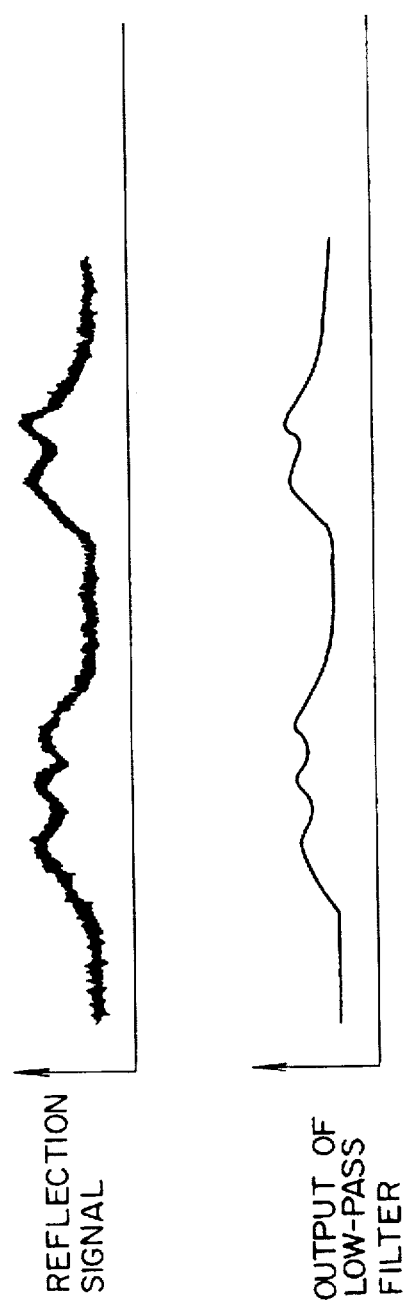

LASER LIGHT POWER CONTROL SYSTEM HAVING REFLECTED LIGHT DETECTOR

BACKGROUND OF THE INVENTION

(1) Field of the invention

The present invention generally relates to a power control system, and more particularly to a power control system for controlling a power of light output from a light source used to optically write information on a recording medium.

(2) Description of the Related Art

In optical disk drive devices and magneto-optical disk drive devices, the power of light emitted from a light source used to optically record data is generally controlled in accordance with an APC (Auto Power Control) manner. FIG. 1 shows an information recording apparatus using a light source in which a power of output light is controlled in accordance with the APC manner. Referring to FIG. 1, the information recording apparatus has a light source 101, a power detecting unit 102, a target setting unit 104, a difference detecting unit 105, a driver unit 106 and a recording information source unit 107.

The light source 101 emits light having a predetermined amount of power. The light emitted from the light source 101 is projected on an information recording medium (MD) through an objective lens 108. The power detecting unit 102 receives a part of the light from the light source 101 and detects the power of the received light. The power detecting unit 102 has a photodetector 201 (e.g., a photodiode) and an amplifier 202. The target setting unit 104 sets a target power at which the light from the light source 101 should be controlled. The difference detecting unit 105 detects a power difference which is the difference between the target power set by the target setting unit 104 and the power detected by the power detecting unit 102. The driver unit 106 drives the light source 101. The recording information source unit 107 supplies to the driver unit 106 recording data which should be recorded in the information recording medium (MD).

The driver unit 106 has a phase compensation circuit 203 used to stabilize a control system and an LD driver 204. The LD driver 204 drives the light source 101 based on recording data supplied from the recording information source unit 107. The LD driver 204 additionally controls the output power of the light source 101 based on the power difference detected by the difference detecting unit 105.

In the information recording apparatus in which the output power of the light source 101 is controlled in accordance with the APC manner, as has been described above, the power detecting unit 102 directly detects the power of the light emitted from the light source 101. That is, the power detecting unit 102 does not detect the power of light which is actually projected on the information recording medium (MD). (Hereinafter, the power of the light which is actually projected on the information is referred to as a recording power.) Thus, if defocusing, tilt or the like occurs in the light between the objective lens 108 and the information recording medium (MD), the intensity distribution of the light projected on the information recording medium (MD) is varied. As a result, even if the light emitted from the light source 101 is stably controlled in accordance with the APC manner, the recording power is not optimally controlled. In addition, based on the temperature characteristics of the light source 101 and/or the power detecting unit 102 (the photodetector 201), a large control error in the APC (Auto Power Control) may occur.

In order to eliminate the above disadvantage, an OPC (Optimum Power Control) manner has been proposed, for example, in Japanese Patent Publication No.57-60696 and "CD-R and in the compatibility with CD", OPTICAL MEMORY SYMPOSIUM 1994, Jacques Heemskerk and Hans Kablau. Power control of the light source in accordance with the OPC is applied, for example, to a WORM (Write Once Read Many)-type CD driving device (CD-WO). In the WORM-type CD driving device, while the light source 101 is irradiating the information recording medium (MD) and recording marks are being formed thereon, the reflected light (the reflection signal) is monitored. The difference between the power of the reflected light (the recording power) and the optimum power is then detected. The recording power is corrected based on the difference. When the actual recording power is greater than the optimum power, a large recording mark is formed. On the other hand, when the actual recording power is less than the optimum power, a small recording mark is formed. Thus, the size of the recording mark is detected based on the variation of the amount of reflected light, and the difference between the actual recording power and the optimum power is detected based on the detected size of the recording mark. The recording power is then corrected.

As has been described above, in the OPC manner, feedback control using the amount of light which is reflected by the information recording medium is performed so that the light source 101 is controlled at the optimum power. As a result, the disadvantage of the APC manner can be eliminated.

However, the conventional OPC manner can be used only when recording marks (pits) having mechanical structures (holes) are formed on a recording medium such as a pigment type recording medium. Light reflected by a phase-change-type recording medium, such as a medium in which information is recorded using crystal-amorphous phase-change, does not include information regarding a size of the recording mark. Thus, the conventional OPC manner cannot be used when information is recorded in the phase-change-type recording medium.

Further, in a case where information is recorded on the recording medium in accordance with a PWM manner (a mark-edge recording manner), a recording mark is formed using multi-pulse waveform as shown in FIG. 3(b). In this case, thus, the recording power further cannot be controlled in accordance with the OPC manner.

SUMMARY OF THE INVENTION

Accordingly, a general object of the present invention is to provide a novel and useful power control system in which the disadvantages of the aforementioned prior art are eliminated.

A more specific object of the present invention is to provide a power control system capable of suitably controlling a recording power with respect to a recording medium in which information is recorded using a phasechange of the recording medium.

The above objects of the present invention are achieved by a power control system for controlling power of light emitted from a light source to a recording medium, the light having a first power being used to erase previous information from the recording medium and the light having a second power being used to record information in the recording medium in a recording operation, the power control system comprising: detecting means for detecting reflected light from the recording medium when the light source emits the light having the first power to erase the information from the recording medium and outputting a reflection signal corresponding to the reflected light; and control means for controlling the first power of the light emitted from the light source so that a level of the reflection signal output from the detecting means is controlled at a predetermined target level.

The above objects are also achieved by a power control system for controlling power of light emitted from a light source to a recording medium, the light having a first power being used to erase previous information from the recording medium and the light having a second power being used to record information in the recording medium in a recording operation, the power control system comprising: first detecting means for detecting power of the light emitted from the light source; first control means for controlling the power of the light detected by the first detecting means at a target; second detecting means for detecting reflected light from the recording medium when the light source emits the light having the first power to erase the information from the recording medium and outputting a reflection signal corresponding to the reflected light; and second control means for controlling the target for the power of the light emitted from the light source based on a level of the reflection signal output from the second detecting means.

According to the present invention, power (at least the first power used to erase the information) of the light emitted from the light source is controlled based on the level of the reflection signal corresponding to the reflected light from the recording medium on which the light source emits the light having the first power to the recording medium. Thus, it is possible to suitably control the power of the light projected onto the recording medium in which information is recorded using the phasechange of the recording medium.

Further, in a case where information is recorded on the recording medium in accordance with a PWM manner (a mark-edge recording manner), the power of the light emitted from the light source can be suitably controlled.

BRIEF DESCRIPTION OF THE DRAWINGS

Other objects, features and advantages of the present invention will become apparent from the following detailed description when read in conjunction with the accompanying drawings, in which:

FIGS. 9A and 9B are waveform diagrams illustrating a function of a low-pass filter in the system shown in FIG. 8;

DESCRIPTION OF THE PREFERRED EMBODIMENTS

A description will now be given of a first embodiment of the present invention.

Figure 2:
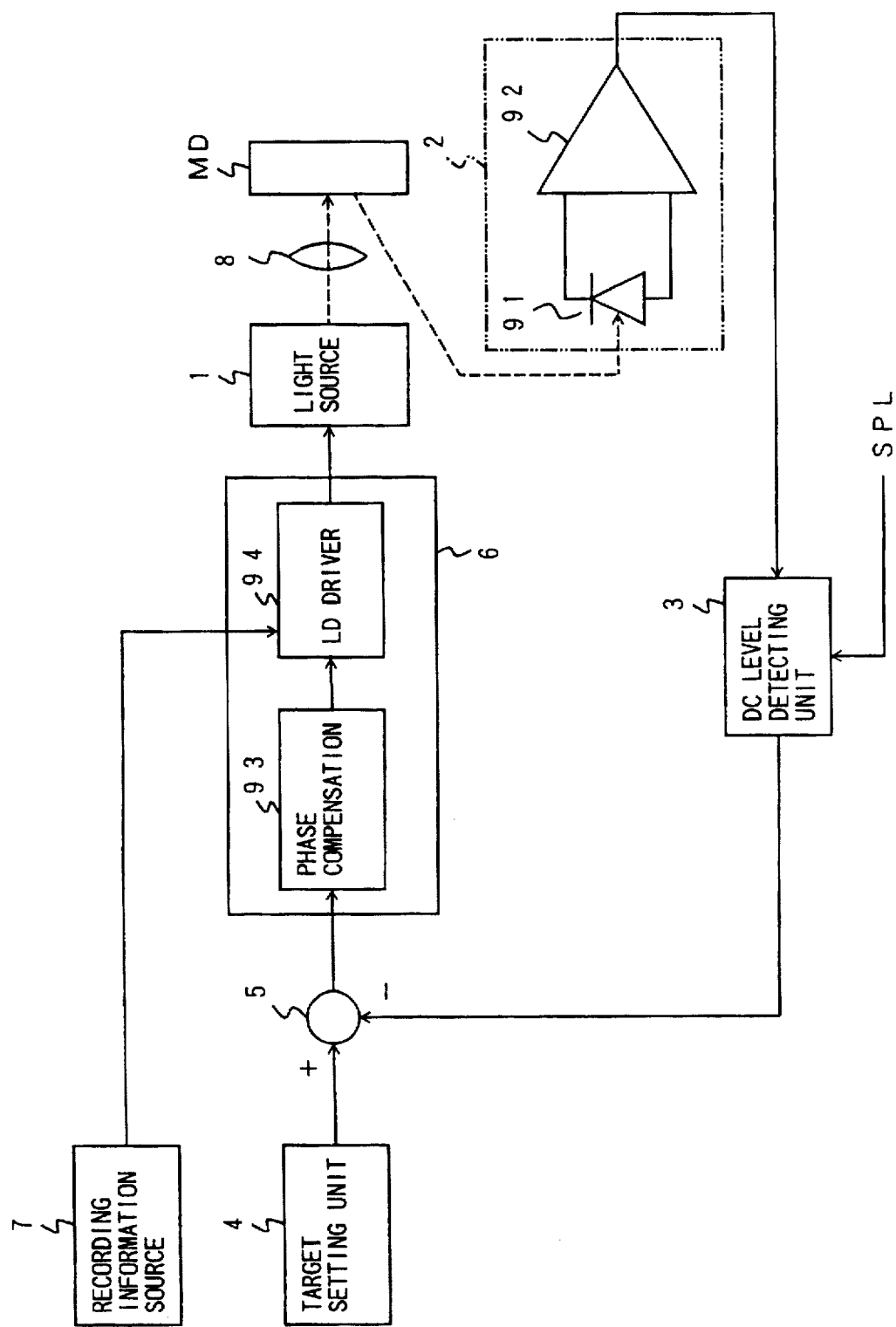
FIG. 2 is a block diagram illustrating an information recording apparatus having a recording power control system according to a first embodiment of the present invention.

An information recording apparatus having a power control system according to the first embodiment of the present invention is formed as shown in FIG. 2. Referring to FIG. 2, the information recording apparatus has a light source 1, a reflected light detecting unit 2, a DC level detecting unit 3, a target setting unit 4, a difference detecting unit 5, a driving control unit 6 and a recording data supply unit 7. The light source 1, such as a laser diode (LD), emits a light beam having a predetermined power. The light beam emitted from the light source 1 travels through an objective lens 8 and is projected onto a recording medium (MD). The reflected light detecting unit 2 has a photo-detector 91 (photo-diode) and an amplifier 92. The photo-detector 91 receives reflected light from the recording medium (MD) and outputs a detected signal. The amplifier 92 amplifies the detected signal from the photo-detector 91 and outputs a reflection signal (an RF signal). The DC level detecting unit 3 detects a DC (Direct Current) level of the reflection signal from the reflected light detecting unit 2. The target setting unit 4 sets a target level at which the DC level of the reflection signal should be controlled. The difference detecting unit 5 detects, as a power difference, a difference between the target level set by the target setting unit 4 and the DC level detected by the DC level detecting. units 3. The driving control unit 6 performs driving control of the light source 1. The recording data supply unit 7 supplies to the driving control unit 6 data which is to be recorded in the recording medium MD.

Figure 1:
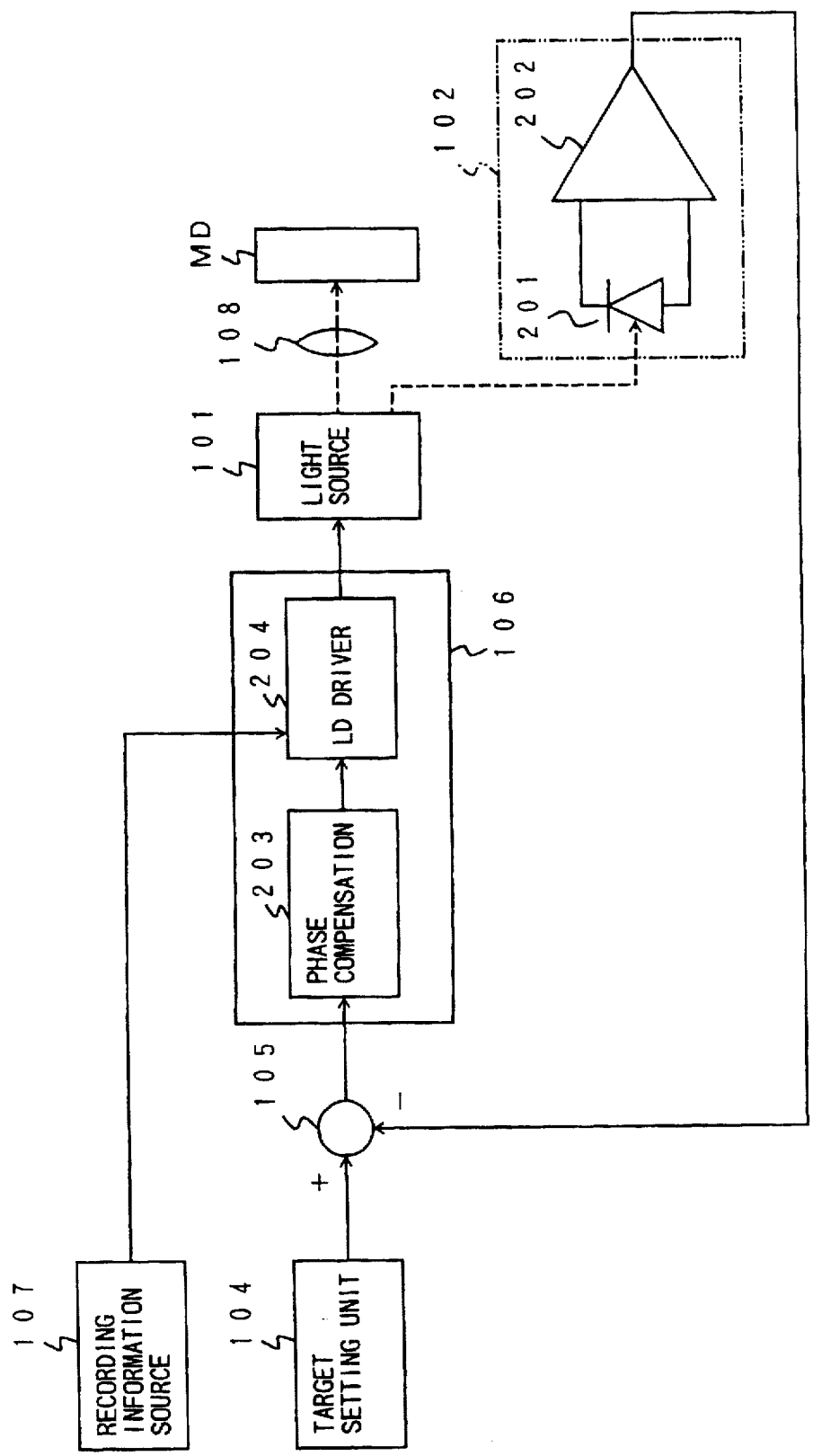
FIG. 1 is a block diagram illustrating a conventional power control system which controls a recording power in accordance with the APC manner.

The driving control unit 6 has a phase compensation circuit 93 and an LD driver 94 in the same manner as the driver unit 106 shown in FIG. 1. The phase compensation circuit 93 stabilizes the power control system. The LD driver 94 drives the light source 1 based on recording data supplied from the recording data supply unit 7. The power (recording power) of the light source 1 is controlled by the LD driver 94 based on the power difference detected by the difference detecting unit 5.

In a phase-change-type recording medium, after previous information is erased using the light having a bias power (an erase power), new information is optically written using the light having the recording power. For example, the bias power is controlled within a range of 5-7 milliwatts (mW) and the recording power is controlled within a rage of 10-15 milliwatts (mW). Further, information is optically read out from the phase-change-type recording medium using the light having a read power. The read power is controlled, for example, at about 0.7 milliwatts (mW).

In this power control system provided in the information recording apparatus, when the light source 1 radiates the light having the recording power, the reflection light from the recording medium is not monitored. On the other hand, when the light source 1 radiates the light having the bias power (the erase power), the reflection light from the recording medium is monitored. Thus, the DC level detecting unit 3 is provided with a sample timing signal SPL when the light source 1 emits the light having the bias power. The DC level detecting unit 3 detects (samples), in synchronism with the sample timing signal SPL, the DC level of the reflection signal corresponding to the reflected light from the information recording medium MD. That is, the DC level detecting unit 3 is formed as a sample-and-hold circuit. When the DC level detecting unit 3 is provided with a pulse of the sample timing signal SPL, the DC level of the reflection signal is sampled. The sampled DC level is held by the DC level detecting unit 3 until the next pulse of the sample timing signal SPL is received. The target setting unit 4 sets the target level at which the DC level of the reflection signal detected when the light source 1 emits the light with the bias power should be controlled.

For example, before a data recording operation starts, the bias power of the light source 1 is optimized in accordance with a learning operation. The DC level which is detected by the DC level detecting unit 3 when the light source 1 emits the light with the optimized bias power may be used as the target level. The DC level of the reflection signal which is detected immediately after the data recording operation starts may also be used as the target level.

In the case where the DC level of the reflection signal detected when the light source 1 emits the light with the optimized bias power is used as the target level, the power of the light source 1 can be controlled at the optimized power from the start of the data recording operation to the completion thereof.

In the case where the DC level of the reflection signal detected immediately after the data recording operation starts is used as the target level, if the optimized bias power has been calculated once as described above, it is not necessary to calculate the optimized bias power again. The optimized bias power is calculated, and the DC level of the reflection signal detected immediately after the data recording operation based on the optimized bias power starts is set as the target level. As a result, the power which is optimized at the start of the data recording operation can be maintained until the data recording operation is completed.

Figure 3:
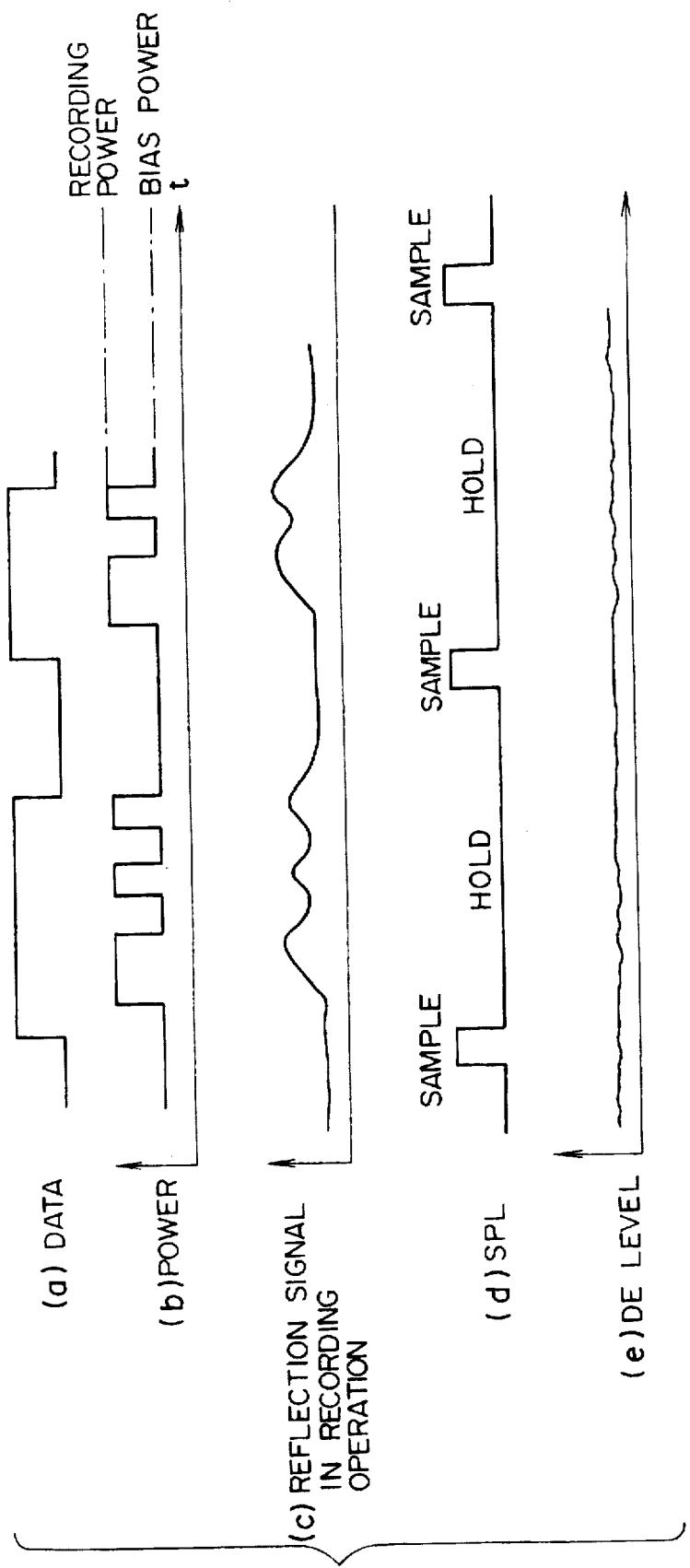
FIG. 3 is a timing chart illustrating signals in the information recording apparatus shown in FIG. 2.

The information recording apparatus described above operates as shown by a timing chart in FIG. 3. In the recording operation, recording data shown in FIG. 3(a) is supplied from the recording data supply unit 7 to the driving control unit 6. The driving control unit 6 supplies recording pulses to the light source 1 so that the light source 1 is driven. That is, the light source 1 is driven so that the light from the light source 1 is controlled at the recording power and the bias power in accordance with the recording pulses as shown in FIG. 3(b). In this example, information is recorded in the recording medium MD in accordance with the PWM manner (the mark-edge recording manner). Thus, the recording pulses are arranged in the multi-pulse waveform.

When the light source 1 driven using the recording pulses shown in FIG. 3(b) irradiates the recording medium MD, the reflection signal corresponding to the reflected light from the recording medium MD varies as shown in FIG. 3(c). The level of the reflection signal varies in accordance with the recording power (a writing power) and the bias power (the erasing power).

The reflected light detecting unit 2 supplies the reflection signal as shown in FIG. 3(c) to the DC level detecting unit 3. The DC level detecting unit 3 is provided with pulses of the sample timing signal (SPL), as shown in FIG. 3(d), when the light source 1 radiates the light with the bias power as shown in FIG. 3(b). Thus, when the light source 1 radiates the light with the bias power, the DC level detecting unit 3 detects the DC level of the reflection signal corresponding to the reflection light from the recording medium (MD) in synchronism with pulses of the sample timing signal (SPL). The DC level detecting unit 3 outputs a DC level signal as shown in FIG. 3(e). The difference detecting unit 5 detects, as the power difference, a difference between the DC level signal detected by the DC level detecting unit 3 and the target level set by the target setting unit 4. The power difference is supplied from the difference detecting unit 5 to the driving control unit 6. The driving control unit 6 controls the power (the bias power) of the light source 1 so that the detected DC level (corresponding to the bias power) is controlled at the target level.

When the light source 1 radiates the light with the recording power, the variation of the reflection signal corresponding to the reflection light from a phase-change-type recording medium is hardly detected. However, as described above, when the light source 1 emits the light with the bias power, the detected DC level of the reflection signal is controlled at the target level so that the power of the light source 1 is optimized.

For example, in the information recording apparatus using the phase-change-type recording medium, even if defocusing and/or tilt occur between the objective lens 8 and the phase-change type recording medium, the power of the light source 1 can be controlled so that the reflected light from the recording medium is at the target level.

In addition, according to the first embodiment of the present invention, in the case where the recording pulse signal having the multi-pulse waveform is used to record information in the recording medium, the power of the light source 1 can be optimized.

Figure 4:
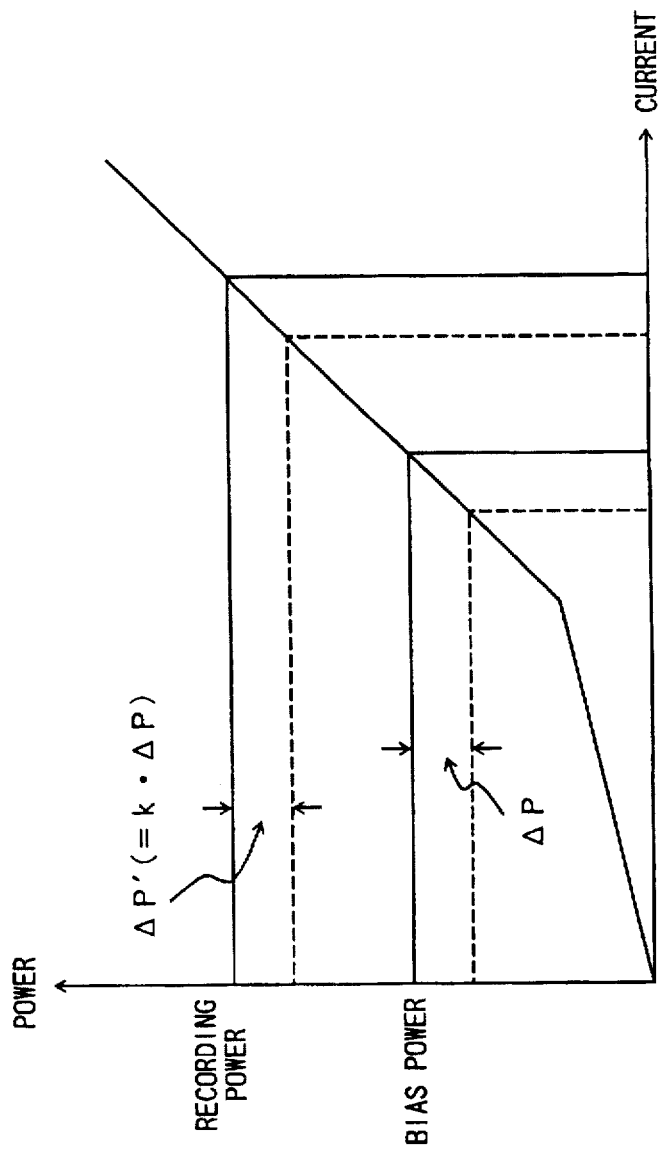
FIG. 4 is a graph illustrating a current-irradiation-power characteristic of a laser diode (LD).

In the above embodiment, a laser diode (LD) is used in the light source 1. The laser diode (LD) has a characteristic relationship between current and irradiation power, as shown in FIG. 4. That is, the irradiation power of the laser diode (LD) linearly varies in accordance with the amount of current flowing through the laser diode (LD) in a state in which the laser diode (LD) radiates coherent light. In this case, when the bias power P is varied from an optimum value by $\Delta P$, the recording power P' which is k-times as large as the bias power ($=k*P$) may be varied from an optimum value by $\Delta P'$ ($=k*\Delta P$).

Thus, based on the DC level of the reflection signal detected when the light having the bias power is projected on the recording medium, the recording power can be controlled at the optimum value. That is, the rate k of the recording power P' to the bias power P is set before the data recording process starts, and a control amount $\Delta P'$ (the variation) of the recording power is calculated in accordance with the equation $$\Delta P' = k*\Delta P.$$

As a result, both the bias power and the recording power of the light source 1 can be controlled using the DC level of the reflection signal detected when the light source 1 radiates the light having the bias power.

Figure 5:
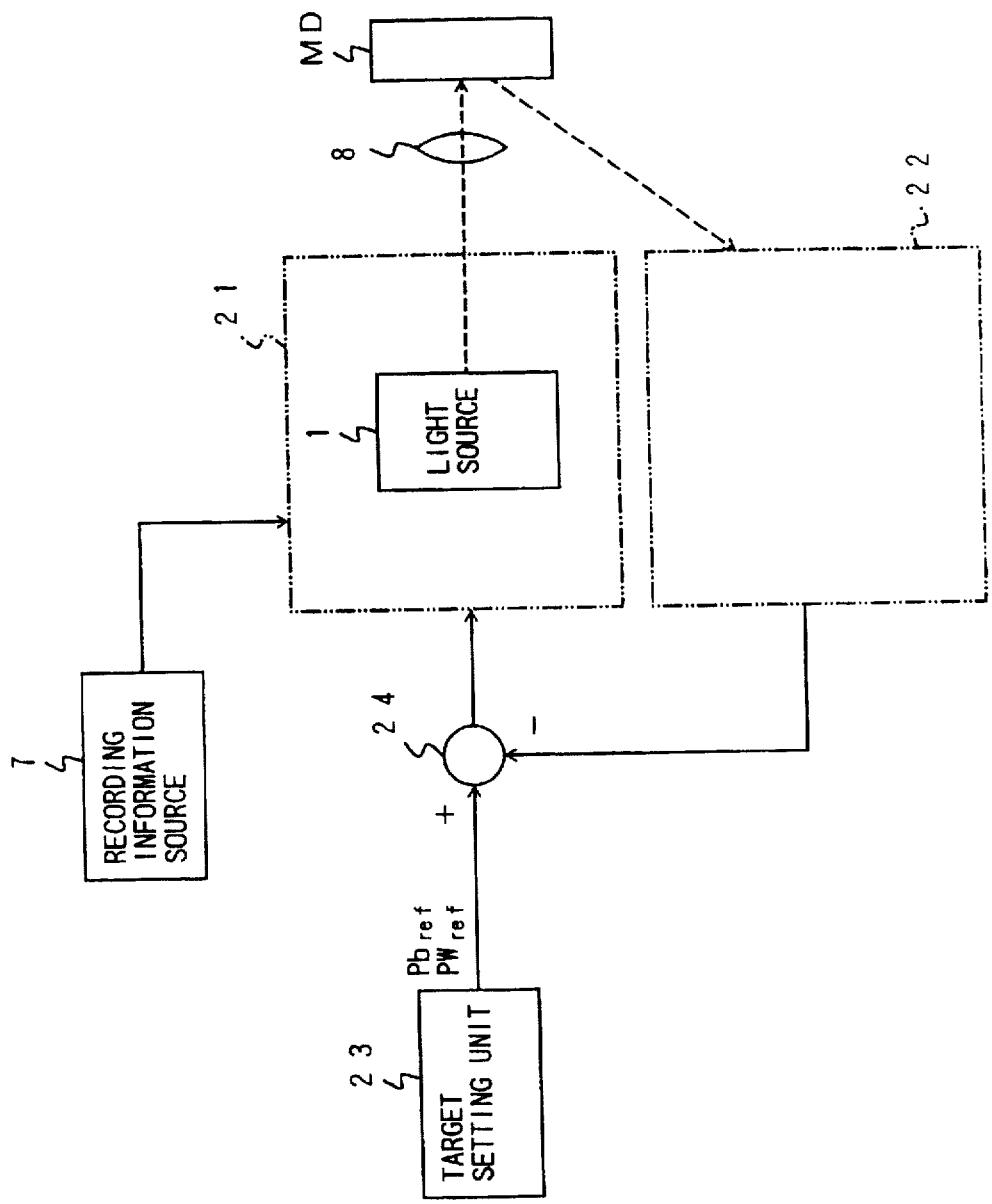
FIG. 5 is a block diagram illustrating an information recording apparatus having a recording power system according to a second embodiment of the present invention.

A description will now be given of a second embodiment of the present invention. An information recording apparatus having a power control system according to the second embodiment is formed as shown in FIG. 5. In this embodiment, a system for controlling the power of the light source 1 in accordance with the APC manner as described in the conventional case (see FIG. 1) and a system for controlling the power of the light source 1 in accordance with the OPC manner as described in the first embodiment are integrated into a single power control system.

Figure 6:
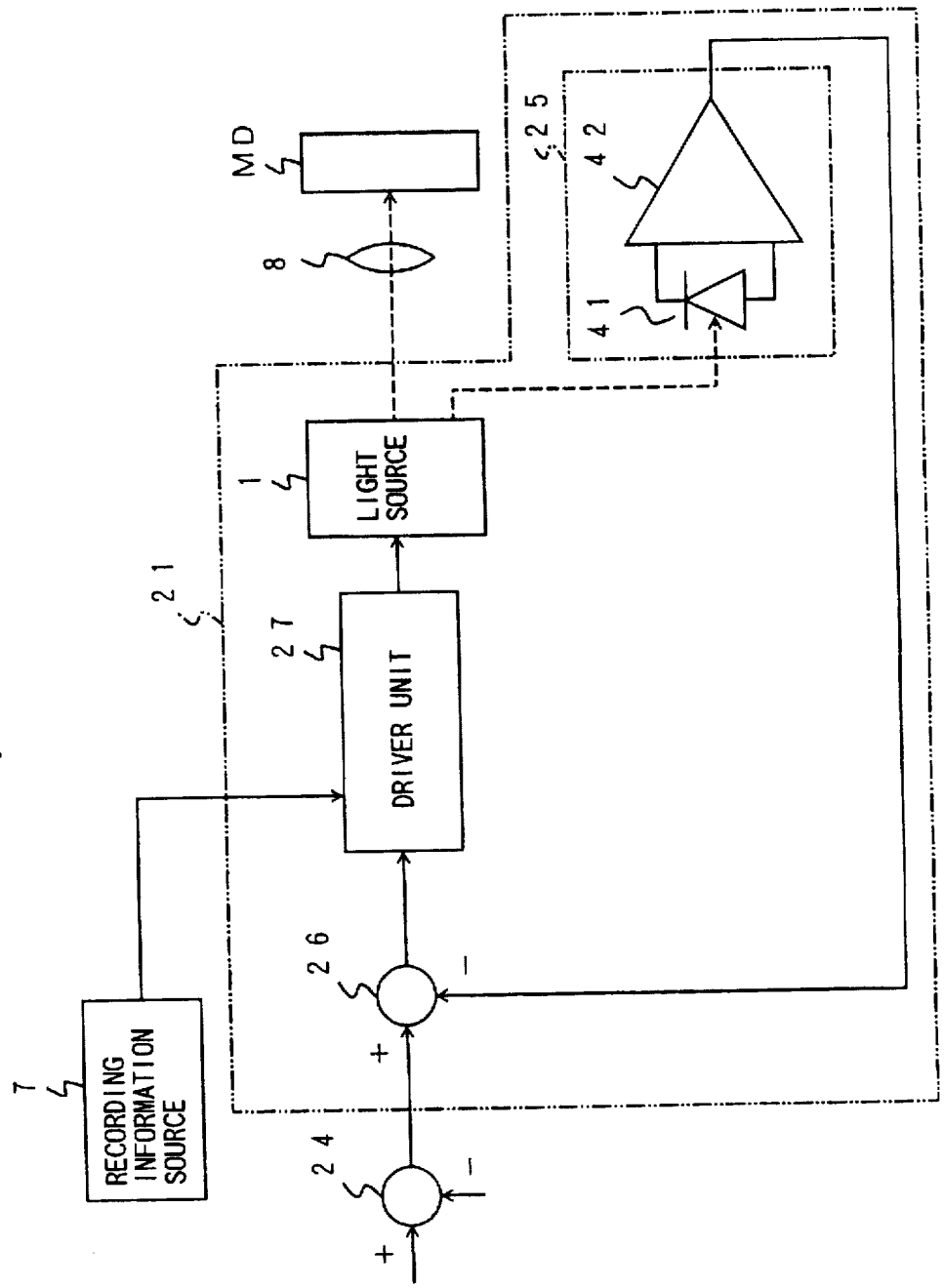
FIG. 6 is a block diagram illustrating a detailed structure of an APC control unit included in the information recording apparatus shown in FIG. 5.

Referring to FIG. 5, the information recording apparatus has an APC unit 21, an OPC unit 22, a first target setting unit 23 and a first difference detecting unit 24. The APC unit 21 is formed as shown in FIG. 6. That is, the APC unit 21 has the light source 1, a power detecting unit 25 (including a photodetector 41 such as a photo-diode and an amplifier 42), a second difference detecting unit 26, and a driver unit 27 which respectively correspond to the light source 101, the power detecting unit 102, the difference detecting unit 105 and the driver unit 106 shown in FIG. 1.

Figure 7:
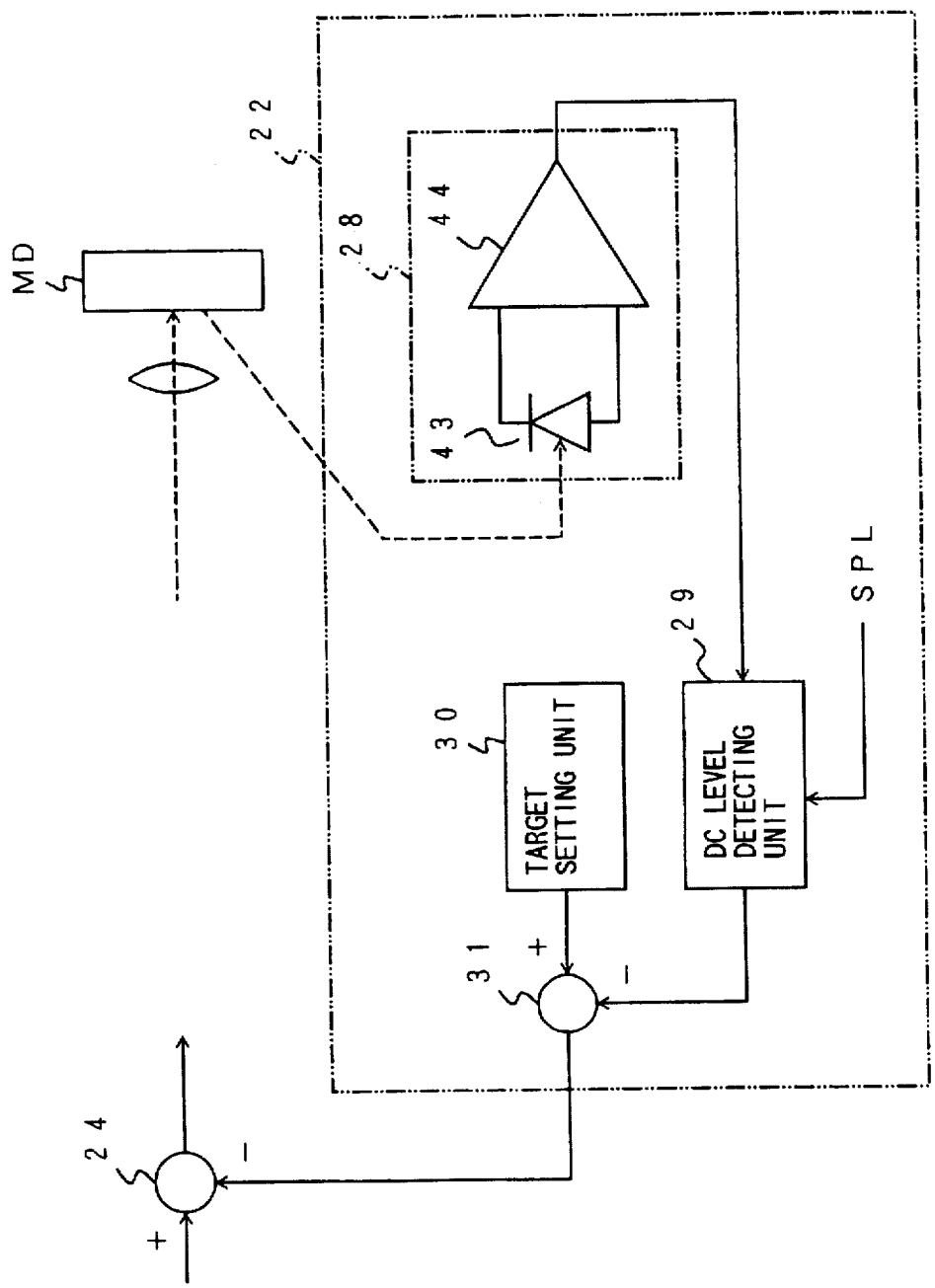
FIG. 7 is a block diagram illustrating a detailed structure of an OPC control unit included in the information recording apparatus shown in FIG. 5.

The OPC unit 22 is formed as shown in FIG. 7. Referring to FIG. 7, the OPC unit 22 has a reflected light detecting unit (including a photodetector 43 such as a photodiode and an amplifier 44) 28, a DC level detecting unit 29, a second target setting unit 30 and a third difference detecting unit 31 which respectively correspond to the reflected light detecting unit 2, the DC level detecting unit 3, the target setting unit 5 and the difference detecting unit 5 shown in FIG. 2.

That is, the second target setting unit 30 of the OPC unit 22 sets a target for a DC level of the reflection signal detected when the light source 1 emits the light having the bias power, in the same manner as in the first embodiment. In periods in which the light source 1 emits the light having the bias power, the third difference detecting unit 31 outputs a variation $\Delta P$ of the bias power which is the difference between the target DC level and the detected DC level. In addition, in periods in which the light source emits the light having the recording power, the third difference detecting unit calculates and outputs a variation $\Delta P'$ of the recording power in accordance with the equation $$\Delta P' = k \cdot \Delta P.$$

The variation $\Delta P$ of the bias power and the variation $\Delta P'$ of the recording power are supplied to the first difference detecting unit 24. The first difference detecting unit 24 corrects a target level $Pb_{ref}$ for the bias power using the variation $\Delta P$ of the bias power. Further, the first difference detecting unit 24 corrects a target level $PW_{ref}$ for the recording power using the variation $\Delta P'$ of the recording power. The corrected target levels for the bias power and the recording power are supplied from the first difference detecting unit 24 to the APC unit 21.

According to the power control system having the above structure, the OPC unit 22 detects the variations of the bias power and the recording power from the optimum values, and corrects the target levels $Pb_{ref}$ and $PW_{ref}$ for the bias power and the recording power in accordance with the detected variations. The corrected target levels $Pb_{ref}'$ and $PW_{ref}'$ are supplied to the APC unit 21. The APC unit 21 then controls the bias power and the recording power of the light at the corrected targets $Pb_{ref}'$ and $PW_{ref}'$ respectively.

According to the second embodiment, even if the defocusing and/or tilt occur between the objective lens and the recording medium (MD), the power of the light emitted by the light source 1 can be controlled in accordance with the APC manner so that the reflected light from the recording medium is optimized.

Figure 8:
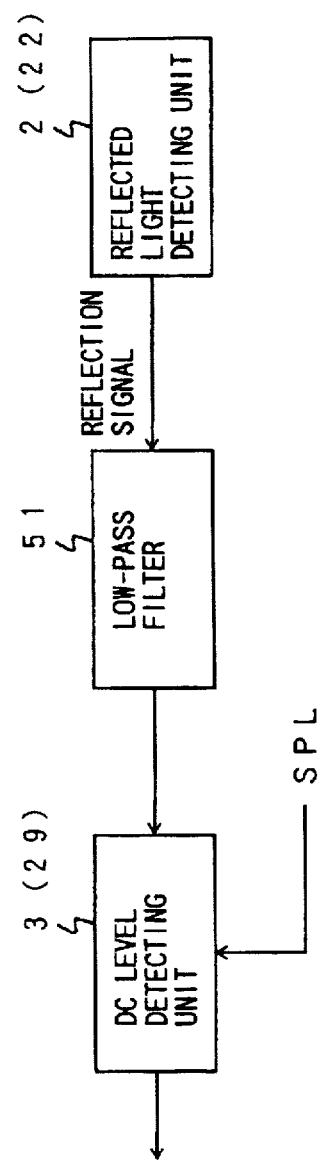
FIG. 8 is a block diagram illustrating a modification of the power control system according to the embodiments of the present invention.

In the respective embodiments described above, the reflection signal output from the reflected light detecting unit 2 (25) may be supplied to the DC level detecting unit 3 (29) through a low-pass filter 51 as shown in FIG. 8. When information is optically read out from the phase-change type recording medium in which information has been overwritten, noises based on data previously recorded in the recording medium are superposed on the reflection signal from the reflected light detecting unit 2 (25). The low-pass filter 51 eliminates the noises (high-frequency components) from the reflection signal, so that the DC level of the reflection signal can be accurately detected. The low-pass filter 51 to which the reflection signal as shown in FIG. 9A is supplied outputs a signal in which noises are eliminated as shown in FIG. 9B.

Figures 10A, 10B, 10C:
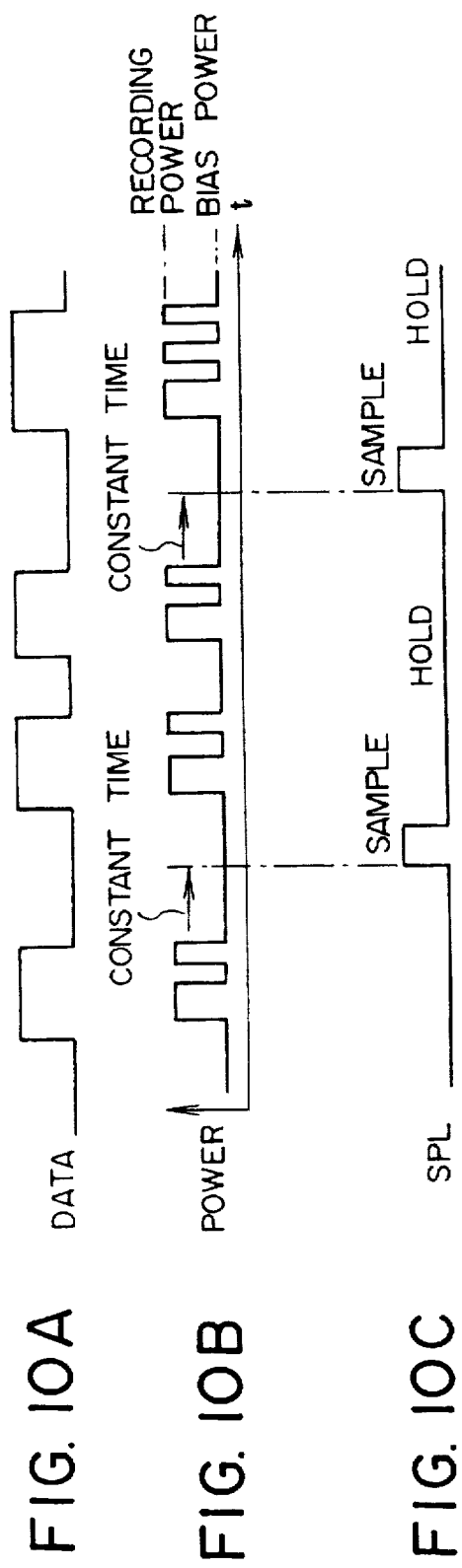
FIGS. 10A, 10B and 10C are timing charts illustrating a relationship between a sample timing signal (SPL) and data and recording power in the recording power control system according to the respective embodiments.

In the respective embodiments, pulses of the sample timing signal (SPL) may be supplied to the DC level detecting unit 3 (29) at any time in a period in which the light source 1 emits the light having the bias power. It is preferable that each pulse of the sample timing signal (SPL) is supplied to the DC level detecting unit after a predetermined time elapses from start of emission of the light having the bias power, as shown in FIGS. 10A, 10B and 10C. In this case, the reflection signal can be sampled at a low frequency. As a result, the operation speed of the sample-and-hold circuit (the DC level detecting unit) can be decreased, so that the production cost of the sample-and-hold circuit can be decreased.

Figure 11:
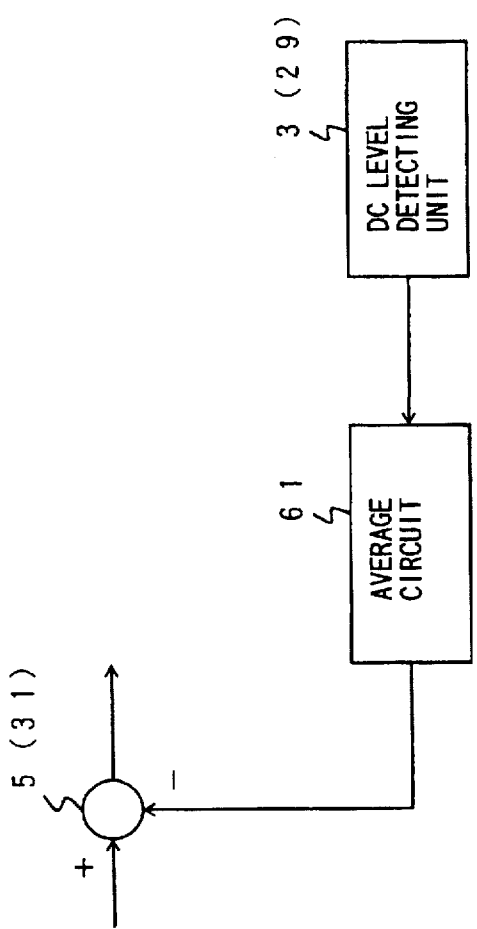
FIG. 11 is a block diagram illustrating another modification of the power control system according to the respective embodiments of the present invention.

Further, in the respective embodiments, as shown in FIG. 11, an average circuit 61 may be provided between the DC level detecting unit 3 (29) and the difference detecting unit 5 (31). In this case, DC levels sampled in synchronism with the sample timing signal (SPL) by the DC level detecting unit 3 (29) are averaged by the average circuit 61. The average DC level output from the average circuit 61 is supplied to the difference detecting unit 5 (31).

When the spot of the light emitted from the light source 1 passes through a defect on the recording medium (MD), the variation of the DC level of the reflection signal is temporarily large. The variation of the DC level affects the power control of the light emitted from the light source 1 as disturbance. Due to using the average of a plurality of DC levels, the variation of a single DC level does not affect the power control of the light as the disturbance.

The power control system according to the present invention can be applied to an information recording apparatus having a recording medium, such as the pigment type recording medium, other than the phase-change-type recording medium.

The present invention is not limited to the aforementioned embodiments, and other variations and modifications may be made without departing from the scope of the claimed invention.

What is claimed is:

1. A power control system for controlling power of light emitted from a light source to a phase-change type recording medium, the light having a first power level being used to erase previous information from the recording medium and the light having a second power level being used to record information in the recording medium in a recording operation, said power control system comprising:

detecting means for detecting light reflected from the recording medium when said light source emits light at the first power level to erase the information from the recording medium and outputting a reflection signal corresponding to the reflected light; and control means for controlling the first power level of the light emitted from said light source so that a level of the reflection signal output from said detecting means is controlled at a predetermined target level.

2. The power control system as claimed in claim 1, wherein said control means has level detecting means for detecting a DC level of the reflection signal, difference detecting means for detecting a difference between the DC level detected by said level detecting means and the target level and means for controlling the first power level of the light based on the difference detected by said difference detecting means.

3. The power control system as claimed in claim 2, wherein said level detecting means has a sampling means for sampling DC levels of the reflection signal at intervals, and average means for calculating an average of the DC levels sampled by said sampling means, the average being supplied as the detected DC level to said difference detecting means.

4. The power control system as claimed in claim 1, wherein a level of the reflection signal which is output from said detecting means immediately after the recording operation starts is set as the target level.

5. The power control system as claimed in claim 1 further comprising:

first means for calculating a controlled variable of the second power level using a controlled variable of the first power level and a rate of the second power level to the first power level; and second means for controlling the second power level of the light emitted from said light source to record the information in said recording medium using the controlled variable of the second power level calculated by said first means.

6. The power control system as claimed in claim 1, wherein said control means has means for eliminating high-frequency components form the reflection signal output from said detecting means, so that said control means controls the first power level of the light based on the level of the reflection signal from which the high frequency components are eliminated.

7. The power control system as claimed in claim 1, wherein said detecting means detects the level of the reflection signal in a period in which said light source is emitting the light having the first power level for a time longer than a predetermined time.

8. The power control system as claimed in claim 1, wherein an optimum level of the reflection signal is set as the target level, the optimum level being a level of the reflection signal output from said detecting means when said light source emits the light having a predetermined optimum first level before the recording operation starts.

9. A power control system for controlling power of light emitted from a light source to a phase-change type recording medium, the light having a first power level being used to erase previous information from the recording medium and the light having a second power level being used to record information in the recording medium in a recording operation, said power control system comprising:

first detecting means for detecting power of the light emitted from said light source;

first control means for controlling the power of the light detected by said first detecting means at a target level;

second detecting means for detecting light reflected from the recording medium when said light source emits light at the first power level to erase the information from the recording medium and outputting a reflection signal corresponding to the reflected light; and second control means for controlling the target level for the power of the light emitted from said light source based on a level of the reflection signal output from said second detecting means.

10. The power control system as claimed in claim 9, wherein said second control means has level detecting means for detecting a DC level of the reflection signal, difference detecting means for detecting a difference between the DC level detected by said level detecting means and a predetermined level and means for controlling the target level for the power of the light based on the difference detected by said difference detecting means.

11. The power control system as claimed in claim 10, wherein said level detecting means has sampling means for sampling DC levels of the reflection signal at intervals, and average means for calculating an average of the DC levels sampled by said sampling means, the average being supplied as the detected DC level to said difference detecting means.

12. The power control system as claimed in claim 9, wherein said second control means has means for eliminating high frequency components from the reflection signal output from said second detecting means, so that said second control means controls the target level for the light based on the level of the reflection signal from which the high frequency components are eliminated.

13. The power control system as claimed in claim 9, wherein said second detecting means detects the level of the reflection signal in a period in which said light source is emitting the light having the first power level for a time longer than a predetermined time.

14. The power control system as claimed in claim 9, wherein the target level for the power of the light includes a first target level at which the first power level of the light should be controlled to erase the information from the recording medium and a second target level at which the second power level of the light should be controlled to record the information in the recording medium, wherein said second control means controls the first target level so that the level of the refection signal is controlled at a first level corresponding to the first power level, and wherein said second control means controls the second target level so that the level of the reflection signal is controlled at a second level corresponding to the second power level.

* * * * *